(12) United States Patent
Raynor

(10) Patent No.: US 10,313,356 B2
(45) Date of Patent: Jun. 4, 2019

(54) SECURE COMMUNICATIONS USING SPAD TOF SYSTEMS

(71) Applicant: STMicroelectronics (Research & Development) Limited, Marlow, Buckinghamshire (GB)

(72) Inventor: Jeffrey M. Raynor, Edinburgh (GB)

(73) Assignee: STMicroelectronics (Research & Development) Limited, Marlow (GB)

(*) Notice: Subject to any disclaimer, the term of this patent is extended or adjusted under 35 U.S.C. 154(b) by 351 days.

(21) Appl. No.: 15/169,172

(22) Filed: May 31, 2016

(65) Prior Publication Data

US 2017/0187721 A1 Jun. 29, 2017

(30) Foreign Application Priority Data

Dec. 23, 2015 (EP) .................................... 15202576

(51) Int. Cl.

| | |
|---|---|
| *H04L 29/06* | (2006.01) |
| *G01S 17/10* | (2006.01) |
| *G01S 7/00* | (2006.01) |
| *G01S 7/486* | (2006.01) |
| *H04B 10/114* | (2013.01) |
| *H01L 31/107* | (2006.01) |
| *H01L 31/167* | (2006.01) |

(52) U.S. Cl.
CPC .......... *H04L 63/107* (2013.01); *G01S 7/006* (2013.01); *G01S 7/4861* (2013.01); *G01S 7/4865* (2013.01); *G01S 17/10* (2013.01); *H01L 31/107* (2013.01); *H01L 31/167* (2013.01); *H04B 10/1143* (2013.01)

(58) Field of Classification Search
CPC ........ G01S 7/483; G01S 7/006; G01S 7/4815; G01S 7/484; G01S 7/486; G01S 17/023; G01S 17/74; G01S 17/10; G01C 3/08; H04B 10/112
See application file for complete search history.

(56) References Cited

U.S. PATENT DOCUMENTS

| | | | |
|---|---|---|---|
| 2008/0208472 A1* | 8/2008 | Morcom | G01S 17/023 701/301 |
| 2013/0193549 A1* | 8/2013 | Lee | H01L 27/10876 257/508 |
| 2013/0286376 A1* | 10/2013 | Rousseau | G01S 7/483 356/4.01 |

(Continued)

FOREIGN PATENT DOCUMENTS

GB          2415560 A          12/2005

OTHER PUBLICATIONS

EPO Search Report and Written Opinion for EP 15202576.3 dated Jun. 9, 2016 (11 pages).

(Continued)

*Primary Examiner* — Luke D Ratcliffe

(74) *Attorney, Agent, or Firm* — Crowe & Dunlevy

(57) ABSTRACT

A ToF SPAD based range detecting module is configurable for operation in a first mode to make a distance determination relative to an object within a field of view. The ToF SPAD based range detecting module is further configurable for operation in a second mode to engage in bi-directional data communication with another apparatus within the field of view.

13 Claims, 7 Drawing Sheets

(56) References Cited

U.S. PATENT DOCUMENTS

2015/0180581 A1 6/2015 Steiner et al.

OTHER PUBLICATIONS

Shi, J-W et al: High-Power and High-Speed ZN-Diffusion Single Fundamental-Mode Vertical-Cavity Surface-Emitting Lasers at 850-nm Wavelength, IEEE Photonics Technology Letters, IEEE Service Center, Piscataway, NJ, US vol. 20, No. 13, Jul. 1, 2008, XP011215998, ISSN: 1041-1135 (3 pages).

Webster, Eric A.G. et al: "A Single-Proton Avalanche Diode in 90-nm CMOS Imaging Technology with 44 Photon Detection Efficiency at 690nm," IEEE Electron Device Letters, IEEE Service Center, New York, NY, US, vol. 33, No. 5., May 1, 2012, pp. 694-696, XP011441948, ISSN:0741-3106, DOI, 10.1109/LED 2012.2187420.

* cited by examiner

SECURE COMMUNICATIONS USING SPAD TOF SYSTEMS

PRIORITY CLAIM

This application claims priority from European Application for Patent No. 15202576.3 filed Dec. 23, 2015, the disclosure of which is incorporated by reference.

TECHNICAL FIELD

Some embodiments relate to an apparatus and in particular but not exclusively to an apparatus with an array of photosensitive devices.

BACKGROUND

Communications systems employ suitable modulated communications media to transfer information from one device to another. An example of which can be light based communications such as employed in infra-red data communications standards to enable devices to communicate with each other. Communications security furthermore is an important part of many communications systems. Securing communications can be achieved in many circumstances by the sharing of cryptographic data such as cryptographic keys which can then be used to encrypt data and secure the means of communications. However, securely sharing the cryptographic data in such a manner that it is difficult to intercept is itself problematic. Although there are known public key systems, it is believed that these systems may not be totally secure and could lead to communications being intercepted, monitored and attacked.

SUMMARY

According to some embodiments there is provided an apparatus comprising: at least one time of flight (ToF) single photon avalanche diode (SPAD) based range detecting module configured to generate at least one distance determination between the apparatus and an object within a module field of view, wherein the module is further configured to communicate with at least one further apparatus further comprising a ToF SPAD based range detecting module.

The apparatus may comprise: a controller configured to: control the at least one ToF SPAD based range detecting module in a first mode of operation to generate at least one distance determination between the apparatus and an object within a module field of view; and control the module in a second mode of operation to communicate with the at least one further apparatus.

The apparatus may further comprise a carrier detector configured to detect a communications signal carrier from the output of the at least one ToF SPAD based range detecting module, wherein the controller may be configured to control the at least one ToF SPAD based range detecting module to operate in the first or second mode of operation based on an output of the carrier detector.

The carrier detector may be configured to generate an interrupt for the controller to control the module in a second mode of operation to communicate with the at least one further apparatus when the carrier detector determines a communications signal carrier.

The apparatus may further comprise a modulator configured to receive data to be transmitted and generate a signal for controlling a VCSEL driver controlling a narrow-beamwidth VCSEL illumination source.

The apparatus may further comprise a demodulator configured to receive an output of at least one SPAD and generate an encoded data output.

The apparatus may further comprise a data decoder configured to decode the encoded data output.

The apparatus may further comprise a clock and data recovery circuit configured to receive an output of at least one SPAD and determine oscillator control signals for controlling an oscillator for clock synchronization between apparatus.

The apparatus may further comprise ranging circuitry for determining the at least one distance determination between the apparatus and an object within a module field of view.

The at least one ToF SPAD based range detecting module may comprise: a narrow beamwidth illumination source, the narrow beamwidth illumination source being able to be controlled to transmission of information to the further apparatus; at least one single photon avalanche detector, the single photon avalanche detector being configured to receive information transmitted by a further apparatus narrow beamwidth illumination source when the apparatus and further apparatus are aligned.

The narrow beamwidth illumination source may comprise at least one vertical cavity surface emitting laser.

According to a second aspect there is provided a method comprising: generating at least one distance determination between the apparatus and an object within at least one ToF SPAD based range detecting module field of view; communicating using the at least one ToF SPAD based range detecting module with at least one further apparatus further comprising a ToF SPAD based range detecting module.

The method may further comprise: controlling the at least one ToF SPAD based range detecting module in a first mode of operation to generate at least one distance determination between the apparatus and an object within a module field of view; and controlling the module in a second mode of operation to communicate with the at least one further apparatus.

The method may further comprise detecting a communications signal carrier from the output of the at least one ToF SPAD based range detecting module; and controlling the at least one ToF SPAD based range detecting module to operate in the first or second mode of operation based on an output of the carrier detector.

Detecting a communications signal carrier from the output of the at least one ToF SPAD based range detecting module may comprise generating an interrupt to control the module in a second mode of operation to communicate with the at least one further apparatus when the carrier detector determines a communications signal carrier.

The method may further comprise: receiving data to be transmitted; and generating a signal for controlling a VCSEL driver controlling a narrow-beamwidth VCSEL illumination source.

The method may further comprise: receiving an output of at least one SPAD; and generating an encoded data output.

The method may further comprise decoding the encoded data output.

The method may further comprise: receiving an output of at least one SPAD; and determining oscillator control signals for controlling an oscillator for clock synchronization between apparatus.

The method may further comprise: determining the at least one distance determination between the apparatus and an object within a module field of view.

According to a third aspect there is provided an apparatus comprising: means for generating at least one distance determination between the apparatus and an object within at least one ToF SPAD based range detecting module field of view using; means for communicating using the at least one ToF SPAD based range detecting module with at least one further apparatus further comprising a ToF SPAD based range detecting module.

The apparatus may further comprise: means for controlling the at least one ToF SPAD based range detecting module in a first mode of operation to generate at least one distance determination between the apparatus and an object within a module field of view; and means for controlling the module in a second mode of operation to communicate with the at least one further apparatus.

The apparatus may further comprise means for detecting a communications signal carrier from the output of the at least one ToF SPAD based range detecting module; and means for controlling the at least one ToF SPAD based range detecting module to operate in the first or second mode of operation based on an output of the carrier detector.

The means for detecting a communications signal carrier from the output of the at least one ToF SPAD based range detecting module may comprise means for generating an interrupt to control the module in a second mode of operation to communicate with the at least one further apparatus when the carrier detector determines a communications signal carrier.

The apparatus may further comprise: means for receiving data to be transmitted; and means for generating a signal for controlling a VCSEL driver controlling a narrow-beamwidth VCSEL illumination source.

The apparatus may further comprise: means for receiving an output of at least one SPAD; and means for generating an encoded data output.

The apparatus may further comprise means for decoding the encoded data output.

The apparatus may further comprise: means for receiving an output of at least one SPAD; and means for determining oscillator control signals for controlling an oscillator for clock synchronization between apparatus.

The apparatus may further comprise: means for determining the at least one distance determination between the apparatus and an object within a module field of view.

BRIEF DESCRIPTION OF DRAWINGS

Some embodiments will now be described by way of example only and with reference to the accompanying Figures in which.

DETAILED DESCRIPTION OF SOME EMBODIMENTS

Figure 1:
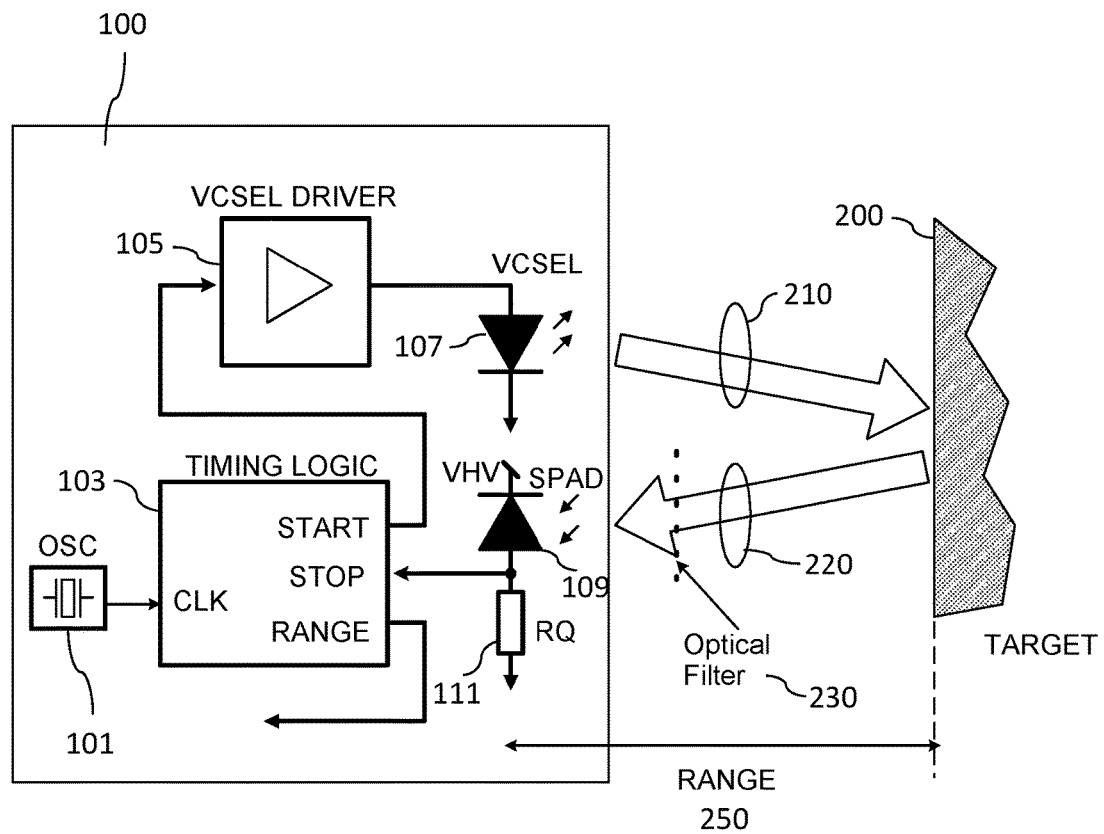
FIG. 1 shows a schematic view of a SPAD ranging module suitable for implementing ranging and communications in a mobile device.

The concept as embodied herein is providing by use of a modified SPAD based light detecting and ranging (LIDAR) module, a secure means of communication between devices, devices and docking station, and people and their devices when they are in close proximity. The apparatus as discussed herein in further detail employs a SPAD ranging module or device to transmit a modulated narrow beam of light to a further SPAD ranging module or device configured to receive the modulated narrow beam of light. The further SPAD ranging module may then demodulate and decode the data which could, for example, be a shared secret or cryptographic key suitable for encoding other communications and means of communications (for example, via a conventional cellular or WiFi data link) between the devices.

Thus, unlike conventional RF communications which are usually omnidirectional, the use of narrow beams of light significantly reduces or prevents the interception and monitoring of the communications by third parties. Furthermore, the use of narrow beams of light ensures that the users of the devices know which device they are communicating with.

Other proximity or close communication systems include Near Field Communications (NFC). NFC is a radio based communication system. NFC often uses a carrier of 13.56 MHz which allows two devices which are in close proximity to communicate. However, the communication is usually done (for both transmission and reception) with an omnidirectional antenna or one which has a wide radiation pattern. Hence, it is possible to monitor that communication is occurring and record the data. This recorded data can be used either for extraction of "metadata" or subsequent decryption. Furthermore, as a result of the omni-directional nature of the communication, the user cannot easily confirm the location of the device with which they are communicating with. This facilitates a "man-in-the-middle" attack, where a nefarious person or device can intercept communications before relaying the data to the desired device and thus attempt to fool the devices that the data is not being intercepted.

Unauthorized RF emissions and communications can be prevented by the use of shielding, for example by implementing a "Faraday cage", metal foil or similar mechanism. If implemented correctly, this is effective in blocking communications from being intercepted. However, a small gap in the shielding can permit unintended radio signals to pass un-noticed. Furthermore, such an approach prevents communication between one device within the cage and one outside of the cage.

As the limitations of RF communications are well known an optical transmission system called "IrDA" has been designed which provides a secure alternative as communication is line-of-sight, i.e. the user must direct the communications to known target, preventing eavesdropping. These systems are not typically implemented due to the size, cost and low data rate of the modules.

Optical systems such as IR LED and photodiode detectors (usually Si) have been implemented on mobile phones and are configured to detect presence/absence of objects. The LEDs and detector systems tend to operate at low pulse frequencies (1 kHz-10 kHz) and typically over a wide angle (30° to 50°) and so are slow and physically insecure as it is possible for a nefarious 3rd party to monitor the communications.

As described herein the concept as described herein is the employment of a time-of-flight (ToF) SPAD based ranging module within a device such as a mobile phone or other electronic apparatus or device, the module being further configured to provide a secure narrow beam high data rate transmitter and receiver capacity. This capacity may be employed, for example, to communicate data at a suitable data rate while also being able to generate ranging data for the device. Furthermore, in some embodiments the capacity may be used to exchange sensitive data such as a cryptographic key exchange which can then enable each device to identify each other and encrypt further communications.

With respect to FIG. 1 a schematic view of a time-of-flight (ToF) based ranging module 100 suitable for implementing secure communications. Time-of-flight (ToF) based ranging modules are generally known and aspects relevant to the understanding of the embodiments as described herein are described to assist the understanding of the modified ranging modules.

The module 100 may comprise an oscillator 101. The oscillator 101 is configured to generate a suitable stable clock signal for other parts of the module. For example, the clock signal may be passed to a timing logic controller 103 to enable timing for generating pulses and timing the period between transmitted and received pulses.

The module 100 may furthermore comprise a timing logic controller 103. The timing logic controller 103 may be configured to output 'start' or enable signals which can be passed to a VCSEL driver 105. In other words, the timing logic controller 103 may be configured to generate a sequence of pulses "START" which cause the light source to emit light.

The module 100 may furthermore comprise a VCSEL driver 105. The VCSEL driver 105 on receipt of the start signal generates signal pulse to power a narrow beam illumination source such as a VCSEL 107.

The module 100 may furthermore comprise a vertical cavity surface emitting laser (VCSEL) 107. The VCSEL 107 is configured to generate a narrow light beam 210 which would typically be reflected from a target surface 200. A VCSEL (vertical cavity, surface emitting laser) 107 is used as it turns on and off quickly (typically 1 ns or less rise time and 1 ns or less fall time) which enables accurate measurement of the light. The emitted light is directed towards the target (a lens on the transmit path 210 is shown in FIG. 1 to collimate the light, but if a VCSEL is used, this may not be required as the beam angle of the VCSEL is small, <5° is typical). The light travels over distance "RANGE" 250 before it reaches the target surface and a proportion is reflected back.

The module 100 may furthermore comprise an optical lens/filter 230. The returning light photons 220 may be focused by the optical filter 230 onto one or more single photon avalanche diodes (SPAD) 109. The optical lens in front of the SPAD may limit the field of view ("FoV") of the SPAD so that more photons from the VCSEL and fewer ambient photons are detected. This FoV range may be chosen based on the expected environment and applications the SPAD is to be used in. A typical FoV for a SPAD may, for example, be +/−5°, +/−10°, and +/−25° or any range in between. Furthermore, in some embodiments the optical filter is configured as an optical band-pass or other filter in front of the SPAD based detector which transmits photons which have similar wave-length to the VCSEL emitter and blocks photons of other wavelengths. This may reduce the number of photons from ambient light. For example, for a VCSEL with a central wavelength of 850 nm which has an effective wavelength range of 830 to 870 nm, the optical filter may be configured to block photons of wavelengths shorter than 830 nm and longer than 870 nm. Similarly, a VCSEL with a central wavelength of 940 nm and which has an effective wavelength range of 920 to 960 nm the optical filter, may be configured to block photons of wavelengths shorter than 920 nm and longer than 960 nm. These blocked photons will be the result of ambient illumination rather than VCSEL emission and can therefore be rejected.

The module 100 may furthermore comprise a photon triggered pulse generator, which in this example is shown by a SPAD 109 and resistor RQ 111 in series. It is understood that the resistor RQ 111 may in some embodiments be implemented as a passive resistor or a suitable 'active load' transistor implementation. The reflected light travels over distance "RANGE" where it impinges on the SPAD 109 which is typically biased at a high voltage "VHV", of the order of 12V to 20V which puts the reverse biased diode into its "Geiger mode". A single photon impinging on the SPAD produces a photo-generated electron. In Geiger mode, this electron is accelerated by the large electric field produced by the high bias voltage and will collide with >1 electron with enough energy to liberate these electrons and so on. This causes an avalanche breakdown of the diode in a very short period of time (100 ps is typical), and the large flow of electrons produces a large current. This current causes a voltage drop across the resistor RQ 111. Hence, a voltage pulse "STOP" is produced in a short period of time after the photon impinges. This pulse can be measured by the timing logic controller 103.

The timing logic controller 103 may be configured to receive the pulse and in a ranging application to use this pulse to time a ranging period and thus generate a suitable range value output.

In some embodiments the oscillator "OSC" 101 may be incorporated onto the same silicon as the timing logic controller 103. Similarly, the VCSEL driver 105 may also be implemented on the same silicon as the timing logic controller 103.

Figure 2A:
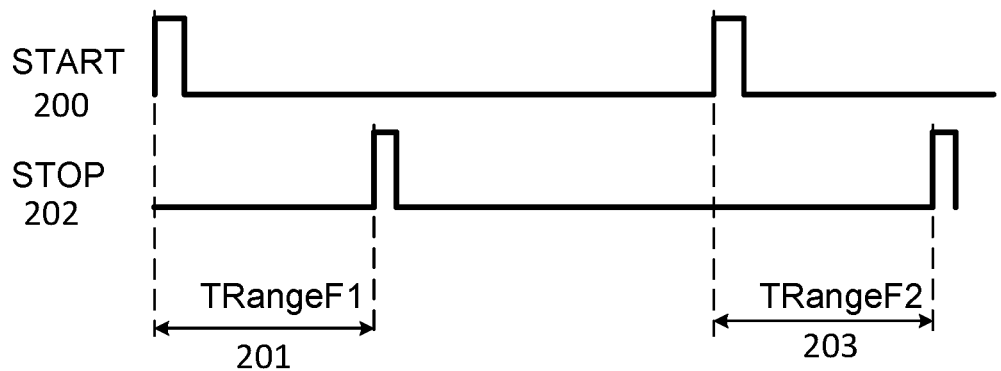
FIGS. 2A-2B show schematic timing diagrams for the SPAD ranging module as shown in FIG. 1, when implementing a ranging mode.

By measuring the time "TRange" between the "START" pulse (when the VCSEL fires) and the "STOP" pulse (when the photon is received), the range (=distance) can be determined $$RANGE = TRangeF * c/2$$

Where "c" in the foregoing equation is the speed of light (approx. $3 \times 10^8$ m/s). The divide by 2 is because the light needs to traverse the distance "RANGE" twice, once to the target and once back from the target. This is shown, for example, in FIG. 2A where the START 200 and STOP 202 pulses are shown and a first TRange period TRangeF1 201 and a second TRange period TRangeF2 203 are shown.

Alternately, "Reverse mode" timing may be employed, where the time between the SPAD firing and the next emission is used. As the pulse rate Tpulse_rate is known, then $$TRangeF1 = Tpulse\_rate - TRangeR1$$

Figure 2B:
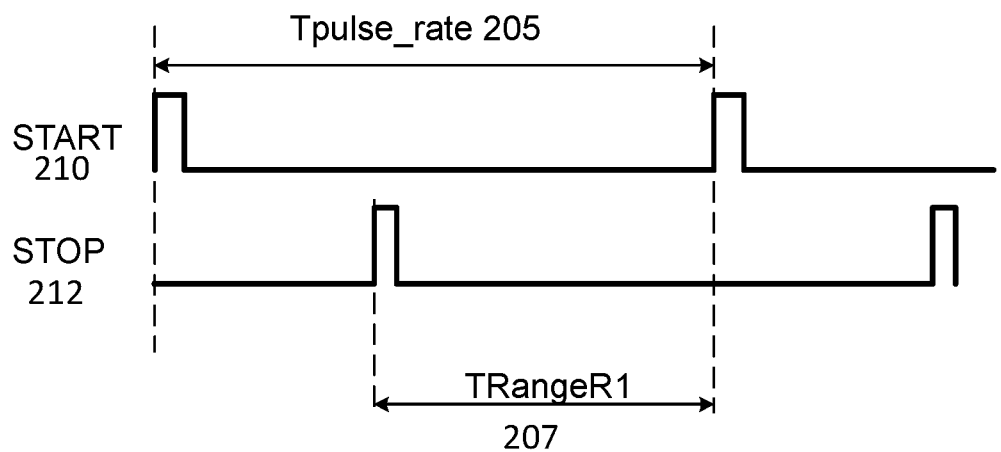

This for example is also shown in FIG. 2B where a sequence of START pulses 210 and STOP pulses 212 are shown and the Tpulse_rate period 205 and TRangeR1 period 207 is shown. Determining the TRangeF value from the TRangeR value enables the range to be calculated in "reverse mode" systems.

In some implementations the process may be repeated many times and the range is calculated by averaging the response time. In some embodiments the TRangeF value may be determined by any known SPAD based method or process. For example, in some embodiments the range value is determined by a determination of a centroid of the histogram of the response times, or by adjusting/tuning a response time timer to determine a peak photon response time. This, in some embodiments, enables the SPAD based range detector to increase accuracy and also reduces (but not eliminates) the effect of ambient illumination which causes un-wanted photons to impinge on the sensor and cause pulses from the SPAD based detector which interferes with the range measurements.

A ToF SPAD based ranging module may report the measured range to an external host (e.g. microcontroller or phone base-band system) typically using I2C or SPI or similar bus using sequence of data bytes to report the measured range and/or status of the measurement process (e.g. no object detected, object too close or other error conditions).

In the embodiments as described herein the timing logic controller 103 may be configured to enable a communication mode as well as a ranging mode. For example, in some embodiments the timing logic controller 103 may comprise a mode controller or control circuitry configured to receive a mode control signal and then generate an enable signal based on whether the module is to be operated in a transmit communications or ranging mode.

Furthermore, in some embodiments the timing logic controller 103 comprises ranging circuitry configured to receive the enable signal and operate when controlled to measure the range data periods. For example, the ranging circuitry may furthermore be configured to receive the START and STOP pulses and thus be able to generate the ranging values as discussed herein. The timing logic controller 103 may further comprise VCSEL logic configured to generate the START pulse (when operating in a ranging mode) and furthermore configured to generate a communications pulse (when operating in a communications mode) based on receiving a suitable modulated data signal.

With respect to the communications capacity of the module, in some embodiments the timing logic controller 103 may comprise or be coupled to a communications data transmitter. The communications data transmitter may be configured to generate suitable outputs which can be passed to the VCSEL logic or VCSEL driver to generate the communications pulses. The communications data transmitter may comprise a data encoder and modulator. The data encoder may be configured to receive a transmitter data input and encode the data according to any suitable method. Furthermore, the encoded data may then be passed to the modulator which is configured to modulate the encoded data using a carrier based modulation in order to generate a modulated transmitter data signal which is passed to the VCSEL logic and then to the VCSEL driver before the pulses being output by the VCSEL.

Furthermore, in some embodiments the timing logic controller 103 may comprise or be coupled to a suitable communications data receiver configured to receive the SPAD pulses and generate received communications data output. For example, the communications data receiver may comprise a filter configured to receive the pulses from the SPAD and perform a low or band pass filtering of the signal. The output of the filter may furthermore, in some embodiments, be coupled to a demodulator.

The communications data receiver may furthermore comprise a demodulator configured to demodulate the filtered pulses and pass the demodulated pulses to a data decoder. In some embodiments, the demodulator may be further configured to detect the occurrence of a communications carrier frequency. Furthermore, in some embodiments the demodulator may be configured to perform or enable the control of the oscillator to enable clock and data recovery (CDR), wherein by detecting the edges of the light changes a signal may be passed to the oscillator to tune the oscillator to bring it into 'alignment' with the transmitter oscillator and thus enable the determination of the carrier and modulated signals. In some embodiments, the receiver (and the demodulator in this example) may be configured to perform CDR on a startup sequence transmitted by the transmitter to enable the receiver to synchronize clocks and thus enable demodulation on the data to occur. In some embodiments, CDR may be performed by any suitable entity within the receiver.

In some embodiments, the carrier detection signal may be used to control which mode the module is operated in.

In some embodiments, the communications data receiver may comprise a data decoder configured to receive the demodulated pulses and apply the reverse of the encoding process used in the transmission of the data. The decoded data may then be output.

Implementing this additional functionality on the silicon thus produces a significantly space efficient module. Furthermore, as the incorporation of SPAD based ToF ranging systems are becoming common in mobile communication devices (either for laser-assisted auto-focus or for proximity detection), the use of these devices for secure communication can be done at minimal cost and with no extra components in the (small) mobile communication devices.

It is understood that by implanting this functionality within the ranging module secure and private communication between two devices in close proximity may be provided whereby the exchange of data such as images, messages, documents, encryption keys, "one-time pad" used for subsequent encryption not using this technique can be performed.

Figure 3A:
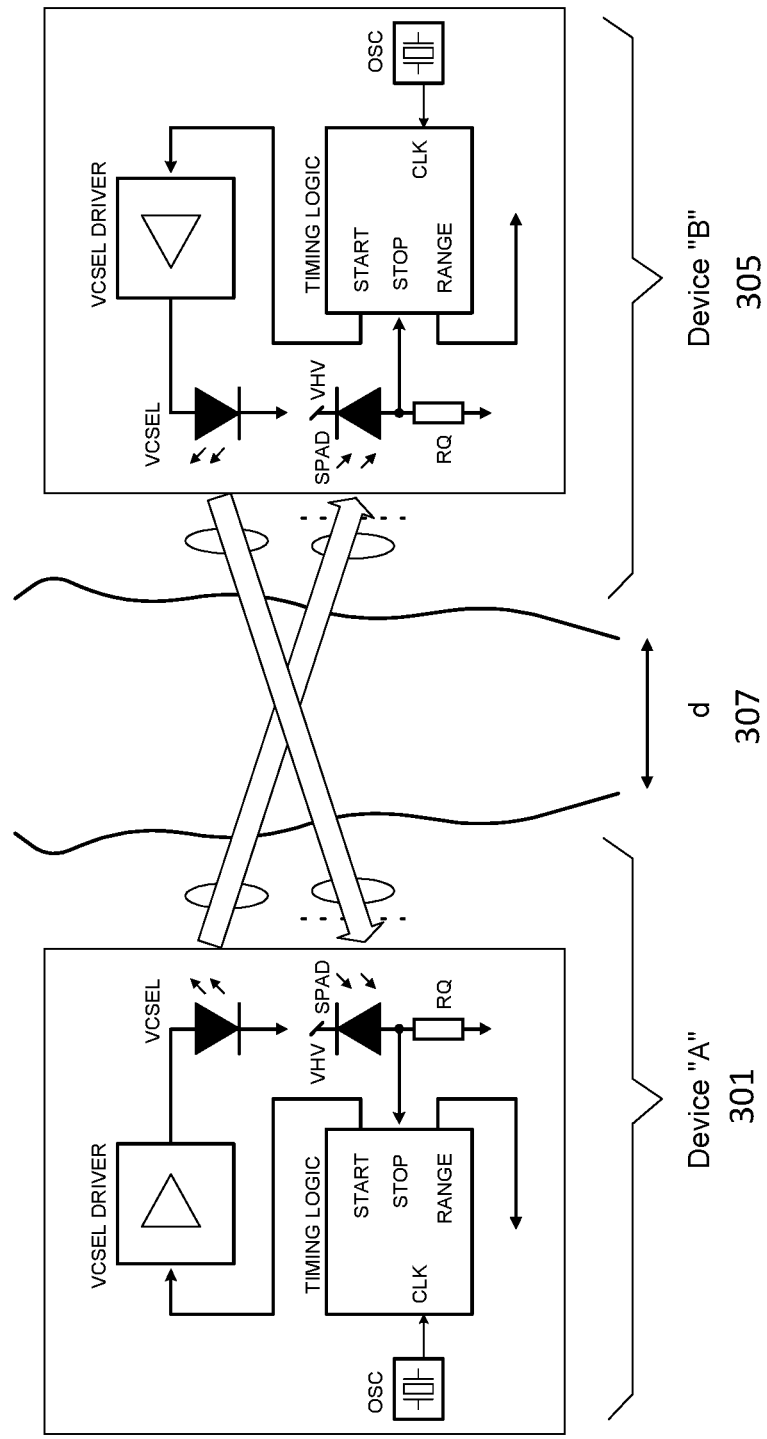
FIG. 3A shows a schematic view of a pair of SPAD ranging modules as shown in FIG. 1 when implementing a secure communication.

FIG. 3A, for example, shows two devices each equipped with a ranging module such as described herein. FIG. 3A shows device "A" (e.g. owned by "Alice") 301 and device "B" (e.g. owned by "Bob") 305. These two devices 301, 305 are spaced a distance apart 307 and arranged such that the light from VCSEL in device "A" 301 is received by the SPAD in the ToF module in device "B" 305 and similarly the light from the VCSEL in device "B" 305 is received by the SPAD in the ToF module in device "A" 301. In such a way, it is possible for device A 301 to communicate securely with device B 305 using the VCSEL to SPAD optical link.

Figure 3B:
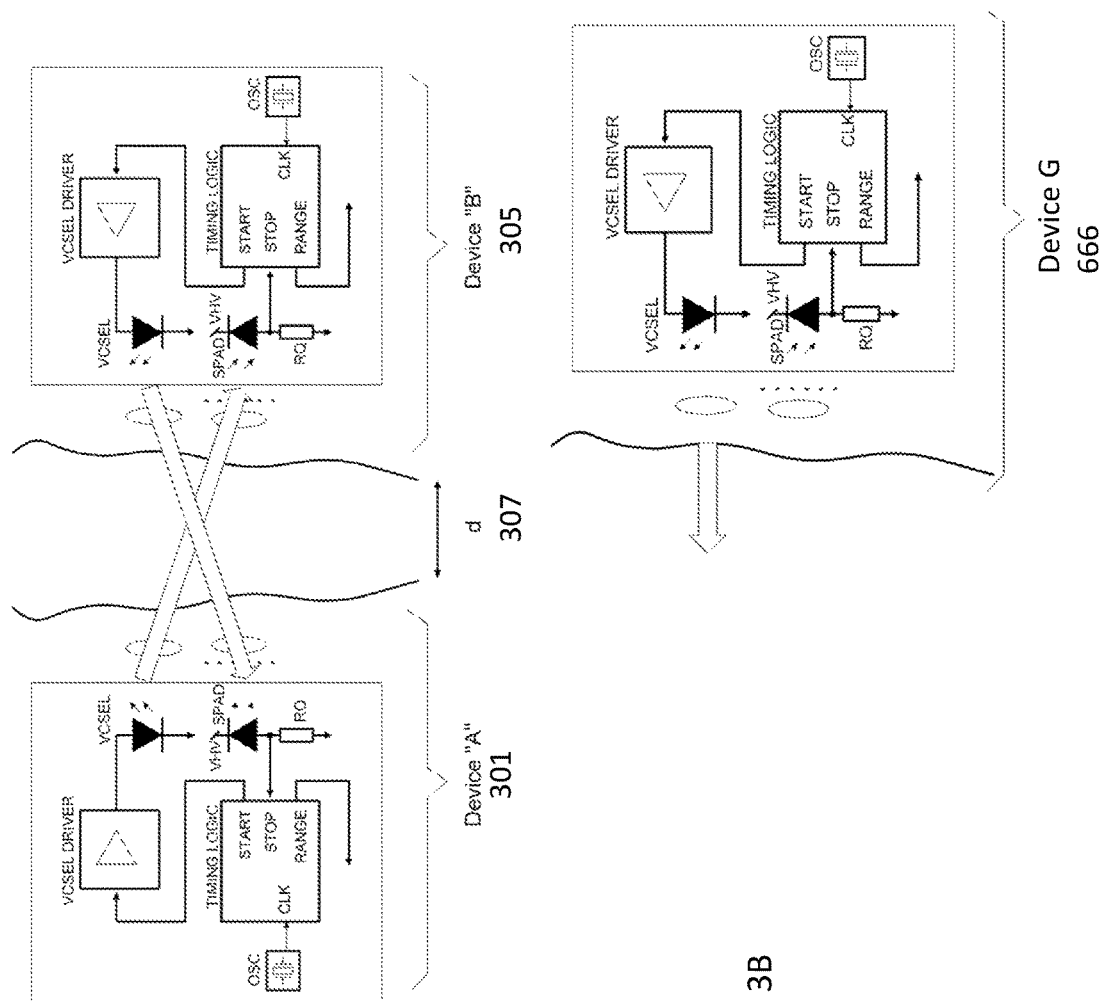
FIG. 3B shows a schematic view of a pair of SPAD ranging modules as shown in FIG. 1 when implementing a secure communication and a further module attempting to intercept the communication.

FIG. 3B shows an advantage of such an implementation as shown in FIG. 3A. In FIG. 3B a malicious device "G" 666 attempts to intercept the communication data from device A 301 or device B 305. Due to the narrow beam angle from the VCSELs in devices "A" 301 and "B" 305, none of the light is detected by device "G" 666 and so is unable to record the data. In addition, the light from device "G" 666 VCSEL does not impinge on either device "A" 301 nor "B" 305 SPAD detector and so cannot impersonate or implement a man in the middle attack on the communication either.

In some embodiments, for example when the ranging module is configured to determine both ranging information and transmit and receive communications, then the users of devices A and B may furthermore determine the distance between the devices and this information may be used to verify that the communication is between the devices rather than another 'further' away device.

Figure 4:
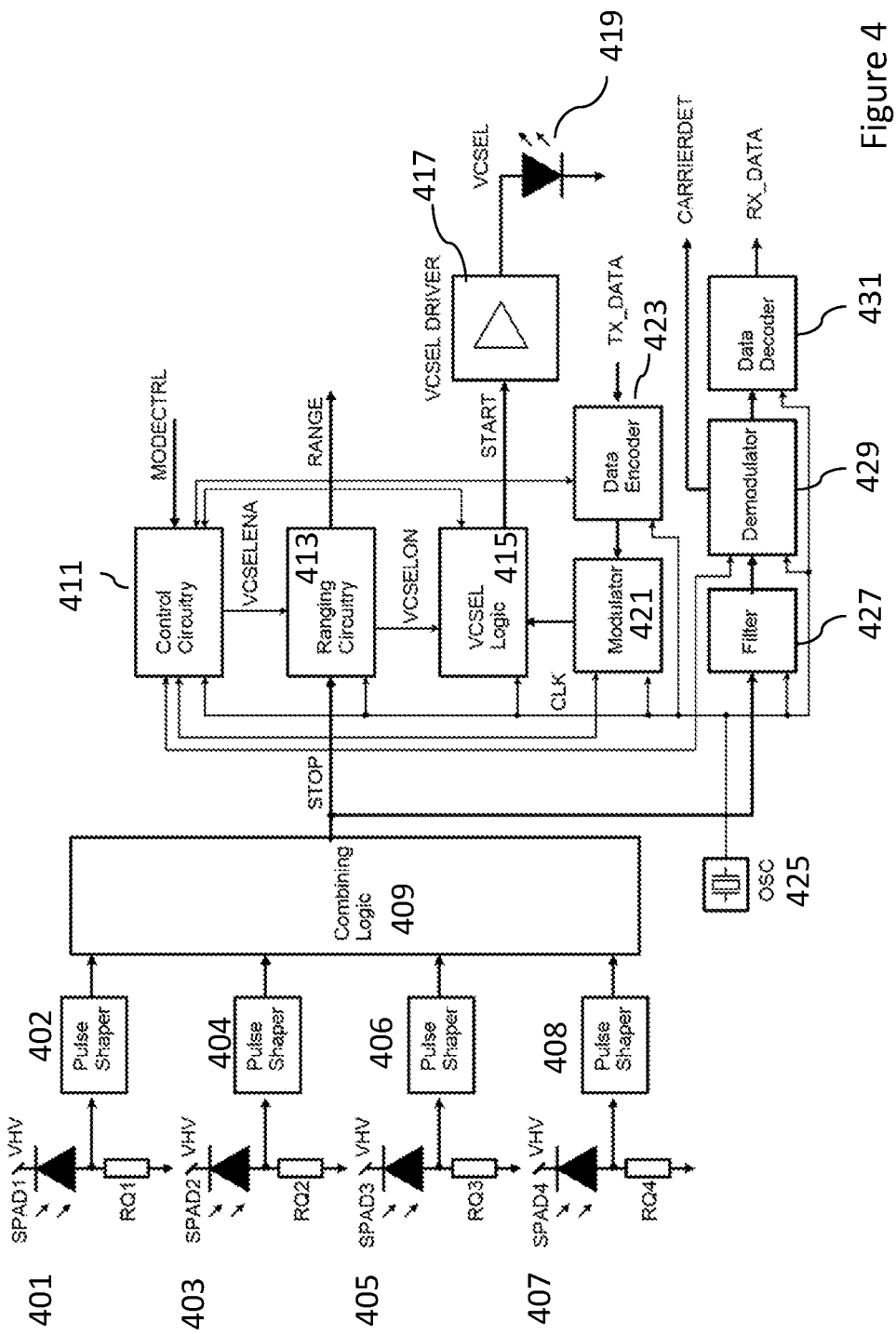
FIG. 4 shows a schematic view of a multiple SPAD ranging module suitable for implementing ranging and communications in a mobile device.

The SPAD (Single photon avalanche diode) detector produces a pulse when a single photon causes the avalanche breakdown, but during and after the avalanche breakdown when the avalanche is being quenched, the SPAD is insensitive to light. This phenomena is called "Photon pile-up" and limits the SPADs sensitivity in higher light levels. A common solution to this problem is to employ multiple SPADs and combine the output, so that if one SPAD has detected a photon and is in breakdown or being quenched, another SPAD is still in its Geiger operating mode and is able to detect another photon. An example of a multiple SPAD ToF module 400 according to some embodiments is shown in FIG. 4 where 4 SPADs 401, 403, 405, 407 are combined. However, in some other embodiments more SPADs can be combined.

Thus, in the example shown in FIG. 4, the ToF module 400 comprises a VCSEL driver 417 and VCSEL 419, which may be similar to the VCSEL driver and VCSEL shown in FIGS. 1, 3A and 3B.

The ToF module 400 furthermore shows the 4 SPADS 401, 403, 405 and 407 as part of a pulse generator. Each pulse generator comprising a SPAD 401, 403, 405, and 407 in series with a resistor RQ1, RQ2, RQ3, and RQ4 and pulse shaper 402, 404, 406 and 408. The output of the pulse shaper from the pulse generator is passed to combining logic 409 which outputs the STOP (or Rx) pulse.

The communications data receiver or receive path in the ToF module 400 may comprise a filter 427 (preferably a band-pass filter, where the filter parameters (centre frequency and bandwidth) are chosen to be suitable for the communication method employed). The filter 427 is configured to receive the output from the combined SPADs (which may reduce the effect of ambient light). Furthermore, the filter 427 may output to a demodulator 429. The filter 427 in some embodiments is a band-pass filter, where the filter parameters (center frequency and bandwidth) are chosen to be suitable for the communication method employed.

The communications data receiver or receive path in the ToF module 400 may furthermore comprise a demodulator 429 configured to demodulate the filtered pulses and output the demodulated pulses to a data decoder 431. Furthermore, the communications data receiver or receive path in the ToF module 400 may comprise a data decoder 431 configured to decode the data and make this data available for use by other parts of the mobile device.

Similarly, the communications data transmitter or transmit path in the ToF module 400 may comprise the data encoder 423. The data encoder may be configured to encode the data in any suitable way. In some embodiments, the encoding renders the communications robust to transmission errors. For example the data encoder 423 may encode the data using Hamming codes, Reed-Solomon codes, BCH (Bose-Chaudhuri-Hochquenghem) codes, Turbo codes etc. The output of the data encoder may be output to the modulator 421.

The communications data transmitter or transmit path in the ToF module 400 may comprise a modulator 421 configured to output modulated signals which are sent to the VCSEL logic 415 and VCSEL driver 417 and transmitted by the VCSEL 419. The modulator 421 as described previously may be configured to employ any suitable modulation scheme for the modulator (and therefore the reverse demodulation scheme for the demodulator). For example, the modulation/demodulation scheme may be, OOK (on-off keying), PAM (pulse amplitude modulation), ASK (analogue shift keying), FSK (frequency shift keying)—using either a single or multiple frequencies, Pulse Position Modulation (PPM), PSK (phase shift keying), OFDM (orthogonal frequency division multiplexing), or DPSK (differential phase shift keying) or trellis modulation.

Furthermore, the ToF module 400 as shown in FIG. 4 comprises a control circuitry 411 wherein a mode control input MODECTRL can select whether the module is to be used in a communications and/or ranging mode.

The ToF module 400 as shown in FIG. 4 also comprises ranging circuitry configured to determine the range based on the received STOP pulse (for example, when the module is in a control circuitry 411.

In some embodiments, the ToF module 400 can be configured to operate as both a SPAD ranger and data transmitter/receiver quasi simultaneously.

Figure 5:
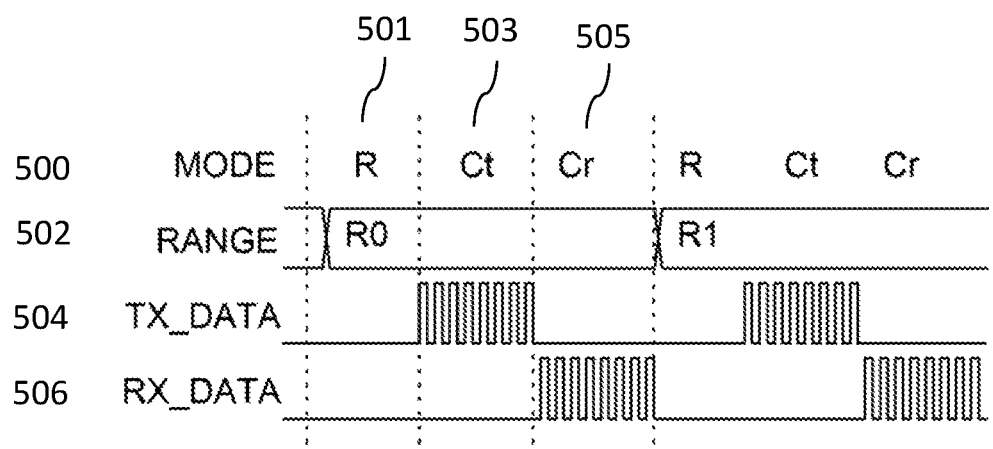
FIG. 5 shows a schematic timing diagram for a first mode of operation of a SPAD ranging module such as shown in FIG. 4.

For example, in some embodiments, and particularly in situations where low data rates are to be transmitted and received, it is possible to interleave modes of operation between communication modes such as a transmission/receiving mode (for example, where the communication is time multiplexed) and ranging. This is shown in FIG. 5 which shows a series of time lines. A first time line shows a mode 500 of the module. Thus, the mode 500 time line shows whether the module is operating in a "R" Ranging mode 501, "Ct" Communication transmission mode 503 or "Cr" Communication receiving mode 505. This is further reflected in the ranging data 502 output which shows a ranging data change during the R 501 sub-period of the ranging cycle, the transmitter data (TX_DATA) 504 output which shows data change during the Ct 503 sub-period, and the receiver data (RX_DATA) 506 output which shows data change during the Cr 505 sub-period.

In some embodiments, the modified module can be configured to operate such that received data has priority over the ranging operation. When a valid carrier has been detected, the control circuitry can be configured to disable the ranging system and optionally signal or control other parts of the mobile device that the ranging system is (temporarily) unavailable. Once the transmission from the other device has ceased or the carrier is lost, then the device and the module may revert back to the ranging operation.

Figure 6:
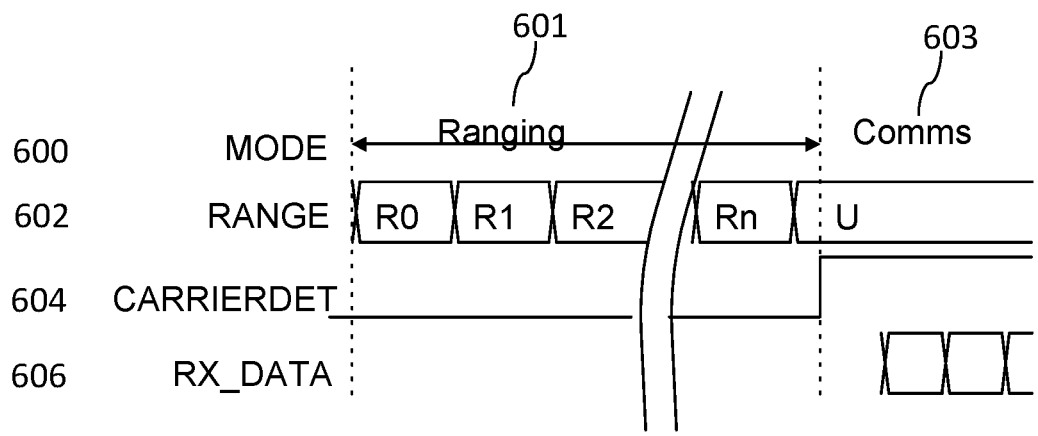
FIG. 6 shows a schematic timing diagram for a further mode of operation of the SPAD ranging module such as shown in FIG. 4.

An example of this is shown in FIG. 6, which shows a timeline of the mode of operation 600 of the module, ranging cycle/data signal 602, a carrier detect signal 604 and a receiver data signal 606. In this example, a default operating mode of the module is ranging 601 as shown in FIG. 6 by the initial Rn range cycles in the ranging data 602 when no carrier is detected. However, as soon as the carrier is detected, as shown by the carrier detect signal 604 going high, then the module may be operated in a communications mode 603 and the control circuitry 411 may be configured to start decoding and outputting received data such as shown in the receiver data signal 606.

Figure 7:
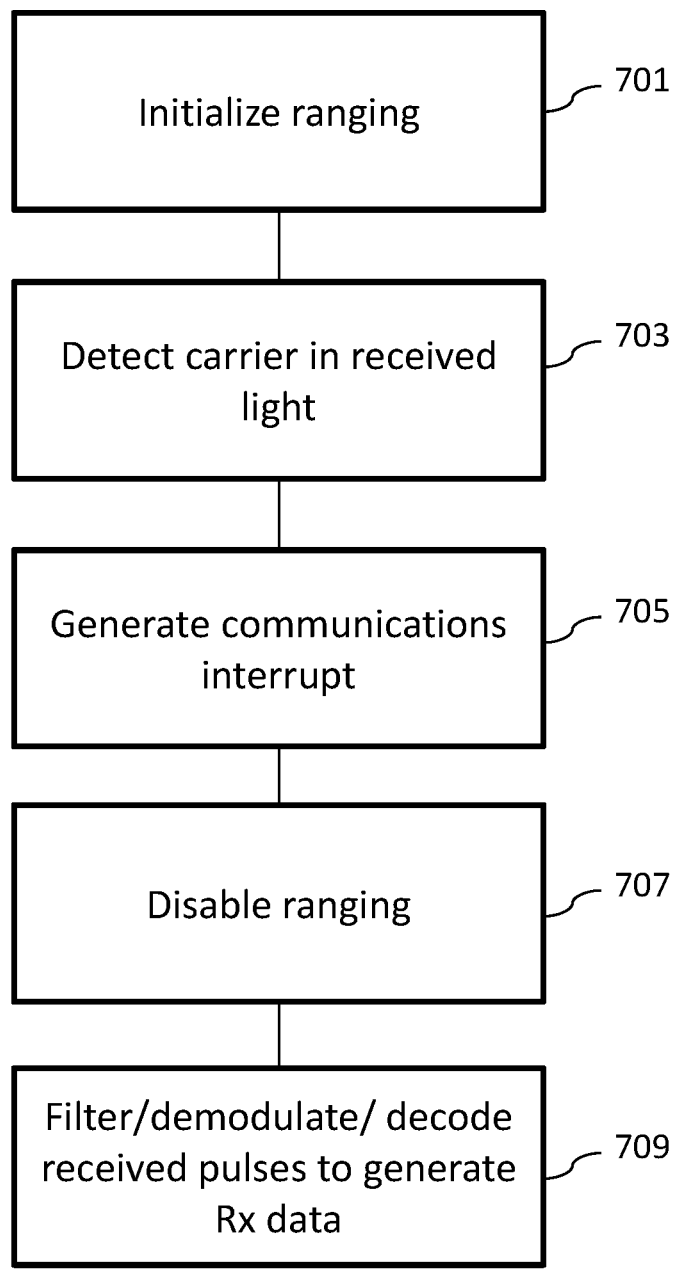
FIG. 7 shows a schematic timing diagram for the operations of the SPAD ranging module implementing the further mode of operation shown in FIG. 6.

These operations are summarized in FIG. 7. Thus, for example, a first step or operation of the controller is to initialize the ranging mode and configured the ranging circuitry and VCSEL logic to operate in a ranging mode.

The operation of initializing the ranging mode is shown in FIG. 7 by step 701.

The filter and demodulator or any suitable carrier detection circuitry may detect a carrier within the received light.

The operation of detecting a carrier within the received light is shown in FIG. 7 by step 703.

The detection of the carrier may cause a communications mode signal or interrupt to be generated and passed to the control circuitry.

The operation of generating a communications mode signal or interrupt is shown in FIG. 7 by step 705.

The controller may, based on receiving the communications mode signal or interrupt, disable the ranging mode. For example, the ranging circuitry may be powered down or disabled to conserve power.

The operation of disabling the ranging circuitry is shown in FIG. 7 by step 707.

The communications data receiver or receive path in the ToF module (such as the filter 427, demodulator 429, and data decoder 431 as shown in the module 400) can then be configured to filter, demodulate and decode the pulse signals to generate and output the received data signal.

The operation of generating and outputting the data signal by the filtering/demodulating/decoding of the pulse data is shown in FIG. 7 by step 709.

In some embodiments, the module can be commanded or controlled to operate in either (ToF) ranging or secure communication modes by a signal from other parts of the device which comprises the modified module.

It should be appreciated that the device may be any suitable device. By way of example only and without limitation, that device may be a mobile telephone, smart phone, tablet, computer, measuring device, switch controller such as for a light, controlling a water supply such as in a tap or toilet, door controller, distance sensor, impact controller, or any other suitable device.

Some embodiments may use other sensors, instead of SPADs. These sensors may be integrating photo-sensitive elements capable of receiving light intensity, time of arrival, frequency or phase or amplitude/intensity modulation, wavelength (color) or other information.

It should be appreciated that the above described arrangements may be implemented at least partially by an integrated circuit, a chip set, one or more dies packaged together or in different packages, discrete circuitry or any combination of these options.

Various embodiments with different variations have been described here above. It should be noted that those skilled in the art may combine various elements of these various embodiments and variations.

Such alterations, modifications, and improvements are intended to be part of this disclosure, and are intended to be within the scope of the present invention. Accordingly, the foregoing description is by way of example only and is not intended to be limiting. The present invention is limited only as defined in the following claims and the equivalents thereto.

The invention claimed is:

1. An apparatus, comprising:
a ToF SPAD based range detecting module configured to operate in a first mode to generate at least one distance determination between the apparatus and an object within a module field of view, and further configured to operate in a second mode to data communicate with another apparatus;
wherein the ToF SPAD based range detecting module includes:
a carrier detector configured to detect a communications signal carrier from the data communication with the another apparatus; and
a controller configured to control operation in the first mode and in the second mode by disabling operation in the first mode in response to the detection of the communications signal carrier by the carrier detector.

2. The apparatus of claim 1, wherein said another apparatus comprises another ToF SPAD based range detecting module.

3. The apparatus as claimed in claim 1, wherein the carrier detector is configured to generate an interrupt for the controller to control the module in the second mode and disable the first mode when the carrier detector detects the communications signal carrier.

4. The apparatus as claimed in claim 1, further comprising a modulator configured to receive data to be transmitted and generate a signal for controlling a VCSEL driver controlling a narrow-beamwidth VCSEL illumination source of the ToF SPAD based range detecting module.

5. The apparatus as claimed in claim 1, further comprising a demodulator configured to receive an output of at least one SPAD of the ToF SPAD based range detecting module and generate an encoded data output.

6. The apparatus as claimed in claim 5, further comprising a data decoder configured to decode the encoded data output.

7. The apparatus as claimed in claim 1, further comprising a clock and data recovery circuit configured to receive an output of at least one SPAD of the ToF SPAD based range detecting module and determine oscillator control signals for controlling an oscillator for clock synchronization between the apparatus and said another apparatus.

8. The apparatus as claimed in claim 1, further comprising ranging circuitry of the ToF SPAD based range detecting module for determining the at least one distance determination between the apparatus and the object within the module field of view.

9. The apparatus as claimed in claim 1, wherein the ToF SPAD based range detecting module comprises:
a narrow beamwidth illumination source that is controllable to transmit information to said another apparatus;
at least one single photon avalanche detector configured to receive information transmitted by said another apparatus from a narrow beamwidth illumination source when the apparatus and said another apparatus are aligned.

10. The apparatus as claimed in claim 9, wherein the narrow beamwidth illumination source comprises at least one vertical cavity surface emitting laser.

11. A method, comprising:
generating using at least one ToF SPAD based range detecting module at least one distance determination between an apparatus and an object within a module field of view in a first mode of operation;
data communicating using the at least one ToF SPAD based range detecting module with at least one further apparatus in a second mode of operation;
detecting a communications signal carrier from the data communication with the another apparatus; and
disabling operation in the first mode in response to the detection of the communications signal carrier by the carrier detector.

12. The method of claim 11, wherein said further apparatus comprises another ToF SPAD based range detecting module.

13. The method as claimed in claim 11, further comprising:
controlling the at least one ToF SPAD based range detecting module in the first mode of operation to generate the at least one distance determination; and controlling the at least one ToF SPAD based range detecting module in the second mode of operation to communicate with the further apparatus.

\* \* \* \* \*